United States Patent
Tanaka (10) Patent No.: US 8,107,133 B2
(45) Date of Patent: Jan. 31, 2012

(54) IMAGE PRODUCTION APPARATUS

(75) Inventor: Hiroshi Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 12/221,348

(22) Filed: Aug. 1, 2008

(65) Prior Publication Data

US 2009/0059193 A1    Mar. 5, 2009

(30) Foreign Application Priority Data

Aug. 30, 2007  (JP) ................. P2007-224730

(51) Int. Cl.
*G03B 27/32* (2006.01)
(52) U.S. Cl. .................. 358/471; 358/474; 355/51
(58) Field of Classification Search .......... 358/471, 358/474; 355/51
See application file for complete search history.

(56) References Cited

U.S. PATENT DOCUMENTS

| | | | |
|---|---|---|---|
| 7,075,562 B2 * | 7/2006 | Ohtaka et al. | 347/239 |
| 2001/0024326 A1 * | 9/2001 | Nakamura et al. | 359/618 |
| 2003/0133082 A1 * | 7/2003 | Sunaga | 353/70 |
| 2003/0147640 A1 * | 8/2003 | Voss et al. | 396/310 |
| 2005/0184947 A1 * | 8/2005 | Maeyama et al. | 345/94 |
| 2005/0237493 A1 * | 10/2005 | Tajiri | 353/85 |

FOREIGN PATENT DOCUMENTS

| | | |
|---|---|---|
| JP | 3401250 | 3/2001 |
| JP | 3164824 | 2/2003 |

* cited by examiner

*Primary Examiner* — King Poon
*Assistant Examiner* — Allen H Nguyen
(74) *Attorney, Agent, or Firm* — Robert J. Depke; Rockey, Depke & Lyons, LLC (57) ABSTRACT

Disclosed herein is an image production apparatus, including a light source; an optical modulation apparatus of the one-dimensional type; and a projection optical system including a scanning optical system; the scanning optical system including a main scanning optical system, and a sub scanning optical system for carrying out scanning in a direction perpendicular to an optical axis, and a scanning direction by the main scanning optical system, the sub scanning by the sub scanning optical system is carried out between frames of the main scanning by the main scanning optical system, a frame rate and an average of substantial numbers of times of movement until the sub scanning optical system returns from a sub scanning origin to the sub scanning origin satisfy a relationship of Rf/Ns>15 where Rf is the frame rate and Ns is the average of substantial numbers of times of movement.

6 Claims, 8 Drawing Sheets

IMAGE PRODUCTION APPARATUS

CROSS REFERENCES TO RELATED APPLICATIONS

The present invention contains subject matter related to Japanese Patent Application JP 2007-224730 filed in the Japan Patent Office on Aug. 30, 2007, the entire contents of which being incorporated herein by reference.

BACKGROUND OF THE INVENTION

1. Field of the Invention

This invention relates to an image production apparatus which includes an optical modulation apparatus of the one-dimensional type which uses, for example, a diffraction grating such that the diffraction angle of light is changed to modulate the light to project an image.

2. Description of the Related Art

An image production apparatus such as a projector or a printer is known wherein image light having one-dimensional image information is scanned by a light scanning apparatus and projected to an image forming member such as a screen or to print paper to form a two-dimensional image.

As one of apparatus for obtaining such a one-dimensional image, an optical modulation apparatus is known which uses a very small electro-mechanical device having an optical function, that is, a MEMS (Micro Electro Mechanical Systems) device.

Most of optical modulation apparatus which use a MEMS device are used for an optical switching system in a broad sense which controls the advancing direction of light or turns on/off light.

As one of types of such optical switching systems, an optical modulation apparatus of the diffraction grating type which uses a one-dimensional optical modulation device formed from a MEMS device having a function of a diffraction grating is known. An optical modulation apparatus of the type described is disclosed, for example, in Japanese Patent No. 3401250 (hereinafter referred to as Patent Document 1) and also in Japanese Patent No. 3164824 (hereinafter referred to as Patent Document 2).

If the optical modulation apparatus of the diffraction grating type is used to modulate light from a light source in accordance with image information or the like to project an image to a planar screen, a cylindrical screen, a wall face indoors or the like or scan the light on print paper or the like, then a two-dimensional image can be displayed or produced.

Where an optical modulation apparatus of the one-dimensional type such as of the diffraction grating type is used to form an image production apparatus in this manner, a modulation factor which provides a great variation in light amount can be implemented and display with a wide bandwidth can be achieved. Consequently, it is possible to provide an image production apparatus of a small size which operates with a low operation voltage.

SUMMARY OF THE INVENTION

However, in an image production apparatus such as a projector or a printer which uses such an optical modulation apparatus as described above, a dispersion of the MEMS device provided for each pixel sometimes occurs in the process of production of the optical modulation apparatus. If such a dispersion as just mentioned occurs, then diffraction light as designed is not obtained with respect to driving power. This gives rise to a problem that, if one-dimensional image light modulated by the optical modulation apparatus is scanned in a horizontal direction or the like by a scanning mirror or the like and projected to a display section such as a screen, then horizontal stripes appear on the image. In addition to the optical modulation apparatus, irregularity of the light source, a scar of the optical system, remaining calibration and so forth similarly make a cause of generation of a horizontal stripe.

Such an optical modulation apparatus of the diffraction grating type as described above is formed from a diffraction grating having totaling, for example, 1,080 sets of electrode structures and each formed from, for example, six beam-shaped diffraction grating elements. It is very difficult at present to produce such diffraction grating elements uniformly with high productivity. Also it is very difficult to control the light source in regard to variation in time or temperature or control the mechanical structure or the like in regard to variation in temperature.

In order to solve the problem of appearance of horizontal stripes arising from a distortion in structure of an optical modulation apparatus, the assignee of the present invention proposed a novel technique in Japanese Patent Laid-Open No. 2006-226809 filed Aug. 23, 2006 in Japan. According to the technique, a pixel is moved in a direction usually in a vertical direction perpendicular to the optical axis and also to the main scanning direction which usually is a horizontal direction to average horizontal stripes. By the technique, horizontal stripes are moderated, and an advantage that display of a good image can be achieved is obtained. However, if the number of times by which an image is moved by sub scanning is extremely great, then there is the possibility that flickering may occur.

Therefore, it is desired to provide an image production apparatus which suppresses flickering of an image as well as horizontal stripes upon production of an image by scanning projection using an optical modulation apparatus of the one-dimensional type.

According to the embodiment of the present invention, there is provided an image production apparatus including a light source, an optical modulation apparatus of the one-dimensional type, and a projection optical system including a scanning optical system, the scanning optical system including a main scanning optical system, and a sub scanning optical system for carrying out scanning in a direction perpendicular to an optical axis and a scanning direction by the main scanning optical system, the sub scanning by the sub scanning optical system being carried out between frames of the main scanning by the main scanning optical system, a frame rate and an average of substantial numbers of times of movement until the sub scanning optical system returns from a sub scanning origin to the sub scanning origin satisfying a relationship $$Rf/Ns > 15 \quad (1)$$

where Rf is the frame rate and Ns is the average of substantial numbers of times of movement.

As described hereinabove, when image light of a one-dimensional form obtained by an optical modulation apparatus of the one-dimensional type is scanned and projected to produce a two-dimensional image, if sub scanning which is scanning in a direction substantially perpendicular to the direction of main scanning is carried out in addition to the main scanning, then appearance of horizontal stripes arising from a fault of the optical modulation apparatus or the like can be suppressed. Although, if the number of stopping positions in the sub scanning is very great, then there is the possibility that flickering may occur as described hereinabove, with the image production apparatus of the embodiment of the present invention, such flickering can be suppressed conspicuously as hereinafter described by setting the frame rate Rf and the average Ns of substantial numbers of times of movement until the sub scanning optical system returns from the sub scanning origin to the sub scanning origin so as to satisfy the relationship of the expression (1) given above.

Further, in the image production apparatus, the movement by the sub scanning is carried out in a mode wherein the movement has some inclination, another mode wherein the movement is divided finely, a further mode wherein the movement is carried out smoothly or a still further mode wherein the movement is carried out in a combination of some of the modes mentioned. Therefore, flickering can be suppressed similarly, and also ringing by the sub scanning can be suppressed as hereinafter described.

Accordingly, with the image production apparatus of the embodiment of the present invention, a good image can be displayed with horizontal stripes suppressed and with occurrence of flickering suppressed.

According to the embodiment of the present invention, with the image production apparatus, where an optical modulation apparatus of the one-dimensional type is used to produce an image by scanning projection, horizontal stripes can be suppressed and also flickering of an image can be suppressed.

The above and other aims, features and advantages of the embodiment of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
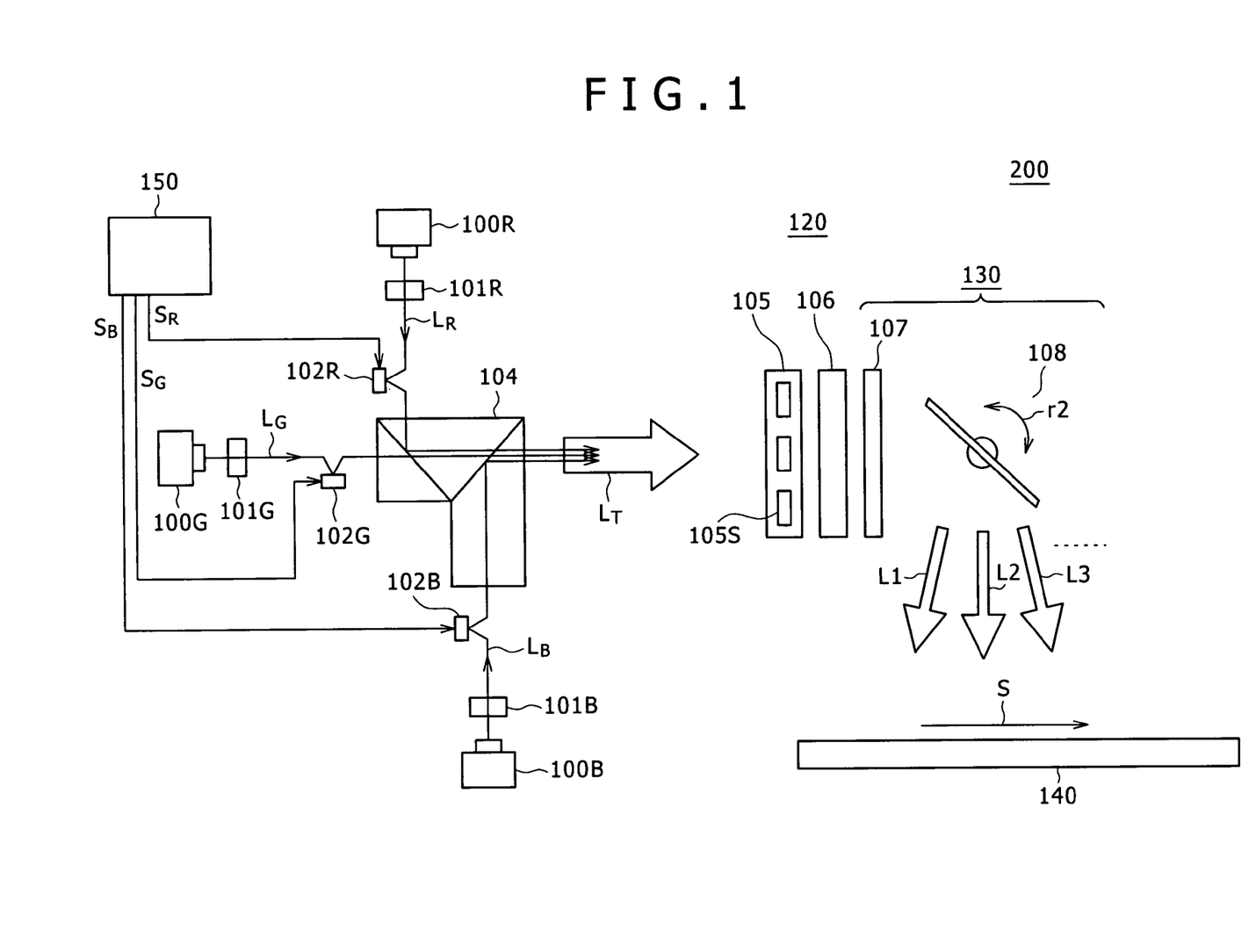
FIG. 1 is a schematic view of an image production apparatus to which the embodiment of the present invention is applied.

Referring first to FIG. 1, there is shown an image production apparatus to which the embodiment of the present invention is applied.

The image production apparatus 200 shown includes light sources 100R, 100G and 100B for emitting laser beams $L_R$, $L_G$ and $L_B$ of the three primary colors of light including red, green and blue.

The laser beams $L_R$, $L_G$ and $L_B$ emitted from the light sources 100R, 100G and 100B pass through illuminating optical systems 101R, 101G and 101B and then are reflected by mirrors not shown to change the optical path thereof such that they are introduced to optical modulation apparatus 102R, 102G and 102B of the one-dimensional type. The laser beams reflected or diffracted by the optical modulation apparatus 102R, 102G and 102B are reflected by mirrors not shown similarly to change the optical paths thereof such that they are introduced into a color synthesis section 104 which may be an L-shaped prism or the like. The laser beams are synthesized into one light flux by the color synthesis section 104 and emitted, for example, as a light beam $L_T$ of the three primary colors.

A light selection section 105 in the form of a spatial filter is disposed on the optical path of the combined light beam $L_T$ such that, for example, one-dimensional image light is selected by the spatial filter. A projection lens 106 is disposed on an emitted light path of the selected image light. Further, a scanning optical system 130 including a sub scanning optical system 107 and a main scanning optical system 108 each including a galvano mirror, a polygon mirror or the like is disposed to form a projection optical system 120.

Then, the image light in the one-dimensional form is scanned as indicated by arrow marks L1, L2, L3, ... by pivotal motion or rotation of the main scanning optical system 108 indicated by an arrow mark r2. Consequently, an image is successively projected to the surface of a display section 140 in the form of a screen or the like in a direction indicated by an arrow mark S.

Here, the optical modulation apparatus 102R, 102G and 102B of the one-dimensional type can be formed using an optical modulation apparatus of the one-dimensional type having the existing configuration disclosed in Patent Document 1 or Patent Document 2 mentioned hereinabove.

Meanwhile, the light selection section 105 is formed, for example, as an Offner optical system and configured such that one light flux having passed, for example, through a schlieren filter 105S as a spatial filter is focused to form an image on the display section 140 through the scanning optical system 130. It is to be noted that the schlieren filter 105S is disposed, for example, on a Fourier plane.

In the optical modulation apparatus disclosed in any of Patent Document 1 and Patent Document 2 described hereinabove, when it is not driven, light therefrom is intercepted by the schlieren filter 105S.

On the other hand, when the optical modulation apparatus is driven, for example, ±first order (m=±1) diffraction light diffracted by the diffraction grating of the optical modulation apparatus is transmitted through the schlieren filter 105S.

Where such an optical modulation apparatus as just described is used, on/off of light to be projected on the display section 140 can be controlled. In particular, voltages to be applied to the modulation elements of the projection optical system 120 are varied with signals $S_R$, $S_G$ and $S_B$ from a driving circuit 150 to vary the intensity of diffracted light by a diffraction grating, which is driven by electrostatic driving, thereby to carry out gradation control.

In the optical modulation apparatus of the diffraction grating, since it is very small in size and besides is fine in modulation factor with respect to the driving power, a high resolution, high-speed switching operation and a great bandwidth can be achieved. Further, since operation with a low application voltage is possible, it is possible to implement an image production apparatus of a significantly reduced size.

Such an image display apparatus as described above can display a very smooth and natural image because a scanning optical system is used for scanning when compared with an ordinary two-dimensional image display apparatus such as, for example, a projection type display apparatus which uses a liquid crystal panel. Besides, since red, green and blue lasers of the three primary colors are used as a light source and light beams of the colors are mixed, such a superior display performance which may not in the past be achieved that an image of a natural color regeneration range can be represented can be achieved.

Or, as a different optical modulation apparatus of the one-dimensional type, also it is possible to use an optical device with an optical modulation function such as, for example, arrayed liquid crystal devices, arrayed laser diodes (LDs), or arrayed light emitting diodes (LEDs) in place of a light source and an optical modulation apparatus.

Now, an example of a more particular configuration of an optical modulation apparatus to which the embodiment of the present invention is applied is described with reference to FIG. 2. It is to be noted that, in FIG. 2, optical paths of beams of the three primary colors of red, green and blue before they are synthesized are represented by merely one optical path.

The image production apparatus 200 includes a laser light source 100, an illuminating optical system 101, and an optical modulation apparatus 102 of the one-dimensional type. The image production apparatus 200 further includes a projection optical system 120. The projection optical system 120 includes a light selection section 105 and a projection lens 106, and a scanning optical system 130 which in turn includes a sub scanning optical system 107 and a main scanning optical system 108. The sub scanning optical system 107 need not necessarily be disposed between the projection lens 106 and the main scanning optical system 108 but may be configured otherwise such that it includes, for example, the light selection section 105, or it may be disposed on any of the optical paths of the projection optical system 120. At whichever position the sub scanning optical system 107 is disposed, the effect of suppressing a horizontal stripe is substantially equal.

For the laser light source 100, for example, a semiconductor laser, a solid-state laser or the like is used. Light emitted from the laser light source 100 is shaped suitably into a one-dimensional shape, that is, into a linear shape, by the illuminating optical system 101 and then irradiated upon the optical modulation apparatus 102. It is to be noted that the illuminating optical system 101 includes a lens system for beam shaping, beam expansion and so forth.

The optical modulation apparatus 102 of the one-dimensional type operates in response to a signal from a driving circuit not shown which is based on an image signal, and light diffracted by the optical modulation apparatus 102 of the one-dimensional type enters the light selection section 105. From the diffracted light, for example, +first order light is selected by a Schlieren filter not shown provided in the light selection section 105, which is formed from an Offner relay optical system or the like, to form image signal light. Consequently, a one-dimensional image 46 is produced again at a position corresponding to the optical modulation apparatus 102 of the one-dimensional type. The one-dimensional image 46 is scanned and enlarged by the projection optical system 120 to project a two-dimensional image in a display region 47 on a display section 140 such as a screen.

Figure 3:
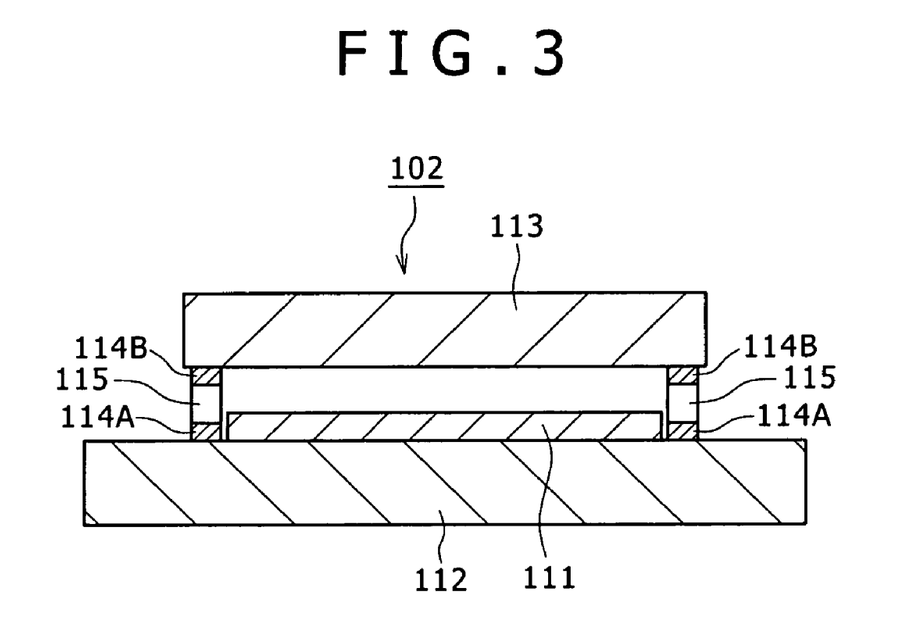
FIG. 3 is a schematic sectional view of an optical modulation apparatus used in the image production apparatus.

FIG. 3 shows an example of a substantially cross sectional configuration of an optical modulation apparatus of the one-dimensional type which can be applied to an image production apparatus of the embodiment of the present invention. Referring to FIG. 3, an optical modulation apparatus 102 of the one-dimensional type includes a beam-shaped optical modulation device 111 of the diffraction grating type such as the beam type formed on a substrate 112 and a light transmission member 113 joined to the optical modulation device 111 in such a manner as to cover the optical modulation device 111 by sealing members 114A and 114B made of, for example, a metal material of a low melting point with a spacer 115 interposed therebetween. As appropriate, the optical modulation device 111 is sealed with a sealing material such as a resin member not shown.

It is to be noted that the optical modulation apparatus 102 of the one-dimensional type includes a plurality of optical modulation devices 111 of the diffraction grating type, and actually, in order to display an image of, for example, 1,080 pixels in the longitudinal direction, approximately 1,088 devices are desired including the margin at the opposite ends. In particular, approximately 1,088 beam-shaped devices are arrayed and juxtaposed in a direction perpendicular to the plane of FIG. 3.

The optical modulation devices 111 are connected to a driving circuit by wiring lines such as a flexible cable not shown. Signals corresponding to image information are supplied from a signal processing section in the driving circuit and a driving voltage is supplied, for example, to alternate ones of the optical modulation devices 111 of the optical modulation apparatus 102. In any of the optical modulation devices 111, when the driving voltage is supplied, for example, the beam-shaped device is distorted by electrostatic force and the surface thereof approaches the substrate 112. When the alternate ones of the optical modulation devices 111 are distorted to the substrate 112 side, a diffraction grating is formed, and if laser light is irradiated upon the projection optical system 120, then diffraction light is emitted from the optical modulation apparatus 102.

Now, the sub scanning optical system 107 is described.

The sub scanning optical system 107 may include, for example, a mirror, a voice coil, a retaining member and a driving circuit. However, this configuration is not necessarily desired if a configuration for adjusting the angle of the mirror is used. A driving waveform is inputted from the driving circuit to the voice coil, whereupon the voice coil moves forwardly and backwardly to adjust the angle of the mirror.

Figure 2:
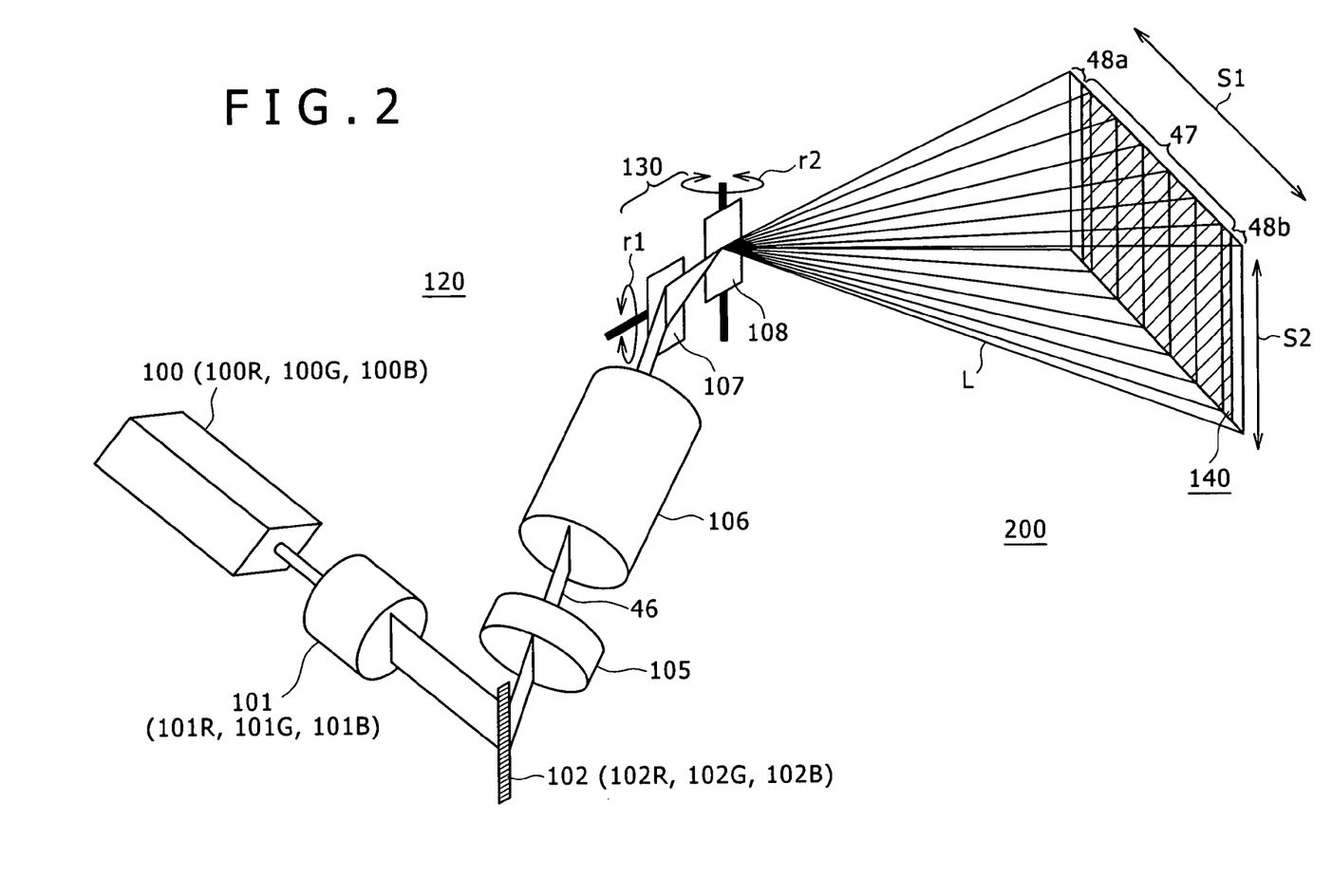
FIG. 2 is a schematic perspective view of the image production apparatus.

Sub scanning by this sub scanning optical system 107 is carried out between frames of main scanning by the main scanning optical system 108, that is, within a period within which no-display regions 48a and 48b of the image shown in FIG. 2 are scanned. It is to be noted that, in the display region 47 for an image, the mirror of the sub scanning optical system 107 is stopped. In the present embodiment, if the frame rate is set, for example, to 240 fps, then one frame corresponds approximately to 4 ms (milliseconds). Within the period, the period within which an image is displayed is approximately 3.4 ms, and the period within which an image is not displayed is approximately 0.6 ms. In particular, within the period of 0.6 ms within which no image is displayed, one sub scanning operation is completed.

By such sub scanning, if the sub scanning optical system 107 is moved by a width corresponding to, for example, n pixels, then if no countermeasure is provided, then also the projected image moves by a distance corresponding to n pixels. Therefore, a process for moving the image signal to be inputted to the optical modulation apparatus 102 of the one-dimensional type by a distance corresponding to n pixels in the reverse direction is carried out by the control circuit in the driving circuit 150 so that the image itself is displayed at a fixed position in the vertical direction without being displaced in the upward or downward direction.

Meanwhile, horizontal stripes generated by ununiformity by the one-dimensional type optical modulation apparatus, variation of the light source in terms of time or temperature, a defect of the optical system, temperature variation of the mechanism and insufficient removal of calibration move upwardly or downwardly by the sub scanning and are spatially dispersed in the upward and downward direction. Therefore, the horizontal stripes are reduced sufficiently.

By carrying out the process of moving an image signal in the opposite direction as described above, the image itself is displayed at a fixed position and besides horizontal stripes caused by a fault of some devices in the optical modulation apparatus 102 are averaged by sub scanning. However, it is a subject to be solved by the embodiment of the present invention to suppress flickering which occurs in place of such averaging of horizontal stripes as described above. According to the embodiment of the present invention, in order to cause the observer of the display image to feel flicking as little as possible, the sub scanning is carried out as irregularly as possible.

It is to be noted that, where the total movement width of sub scanning is great, horizontal stripes of various widths can be suppressed. For example, where sub scanning is carried out within the width of, for example, seven pixels, suppression of horizontal stripes is effective merely for horizontal stripes from the 0-pixel width to the 14-pixel width and the effect of suppression of horizontal stripes of great widths is low. On the other hand, if sub scanning is carried out, for example, with the 31-pixel width, then substantially all of horizontal stripes of various widths up to the 31-pixel width can be removed. Accordingly, the total movement width by sub scanning is preferably set to a value as high as possible.

Further, as the total number of stopping locations increases, the spatial dispersion effect of horizontal stripes increases, and consequently, the horizontal stripe suppression effect increases.

Here, the movement pixel width n need not be an integer-pixel width, but, for example, if a ½ pixel width or ⅓ pixel width is used as a unit of movement, then by suppressing an image signal corresponding to the movement width to the optical modulation apparatus 102, the resolution can be raised artificially.

1. First Working Example

As a first working example of the embodiment of the present invention, an example wherein flicking is suppressed in addition to suppression of horizontal stripes is described. Various examples of a mode of movement of the sub scanning optical system of the image production apparatus which includes the sub scanning optical system having the configuration described above are described. For evaluation of flickering, an all-white image and an all-black image were used.

In the present embodiment, sub scanning by the sub scanning optical system 107 described hereinabove with reference to FIGS. 1 and 2 is carried out between frames of main scanning, that is, during display of no image, and movement in sub scanning is selected in such a manner as to satisfy the following expression $$Rf/Nsa > 15 \quad (1)$$

where Rf is the frame rate, and Nsa is the average of substantial movement time numbers during returning from the sub scanning origin to the sub scanning origin.

Although, where the number of stopping positions by sub scanning is great, flickering occurs as described hereinabove, the flickering can be suppressed significantly by satisfaction of the relationship of the expression (1) above.

In order to implement the relationship of the expression (1) above, it is necessary to set the frame rate Rf to a high value or to set the average Ns of substantial stopping time numbers during retuning from the sub scanning origin to the sub scanning origin to a low value. For example, in the former case, if the frame rate is changed from 60 fps (frame/second) to 240 fps, then the maximum number of times by which movement can be carried out per one second increases from 60 to 240, and the flickering caused by the movement becomes less conspicuous as much. On the other hand, in the latter case, if the number of times of movement within one cycle of sub scanning, that is, within a period within which returning from the sub scanning origin to the sub scanning origin is carried out after movement to various positions, decreases, then flicking becomes less conspicuous similarly. Here, the reason why the term substantial movement time numbers is used is that, even if the movement time number is equal, if the sequence of movement is complicated, then flickering can be suppressed. Further, the reason why the term average is used is that the movement need not necessarily be repeated in the same movement time number or in the same movement sequence for each one cycle of sub scanning.

From such a point of view as described above, the average Nsa of substantial movement time numbers during returning from the sub scanning origin to the sub scanning origin is defined as given by the following expression (2) in order to include an influence which the sequence of movement of sub scanning has on flickering:

$$Nsa = \text{repeated average of } \{Nm \times (2 \times Wm)/Wma\} \quad (2)$$

Where Nsa is the average of substantial movement time numbers during returning from the sub scanning origin to the sub scanning origin, Nm the number of times of movement during returning from the sub scanning origin to the sub scanning origin, Wm the total movement width, and Wma the sum of absolute values of the movement widths.

Figure 4A:
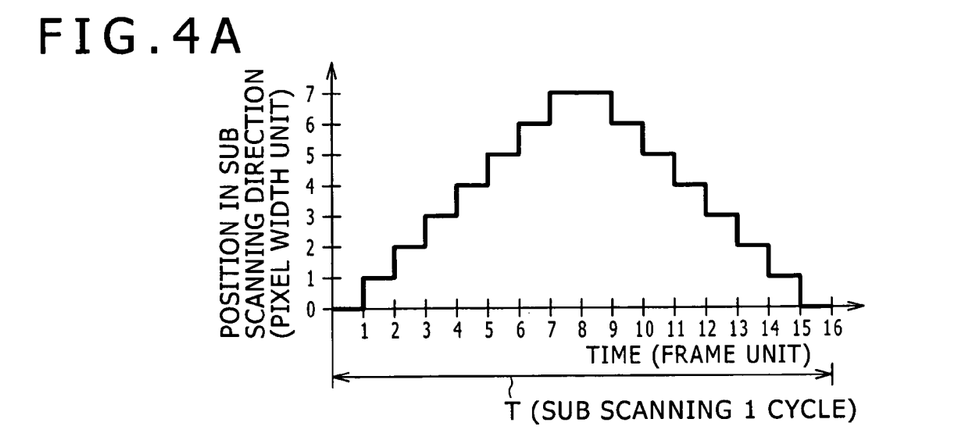
FIGS. 4A to 4C, 5, 6A and 6B are diagrammatic views illustrating different examples of a movement mode of sub scanning by a sub scanning optical system of the image production apparatus.
Figure 4B:
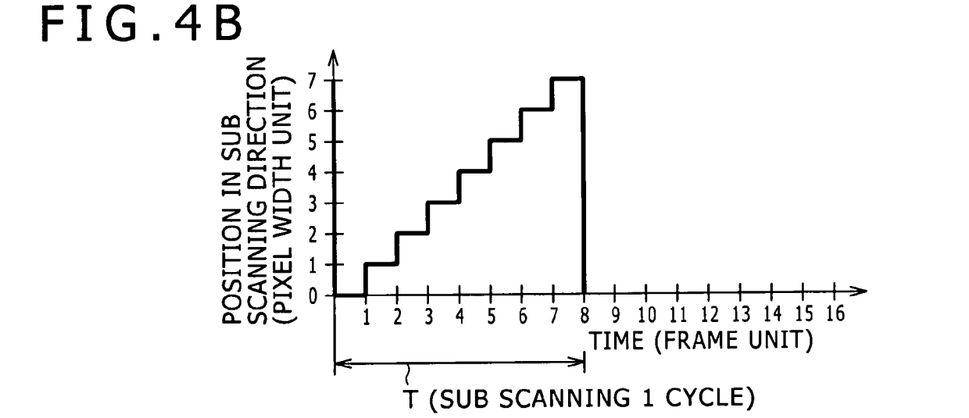
Figure 4C:
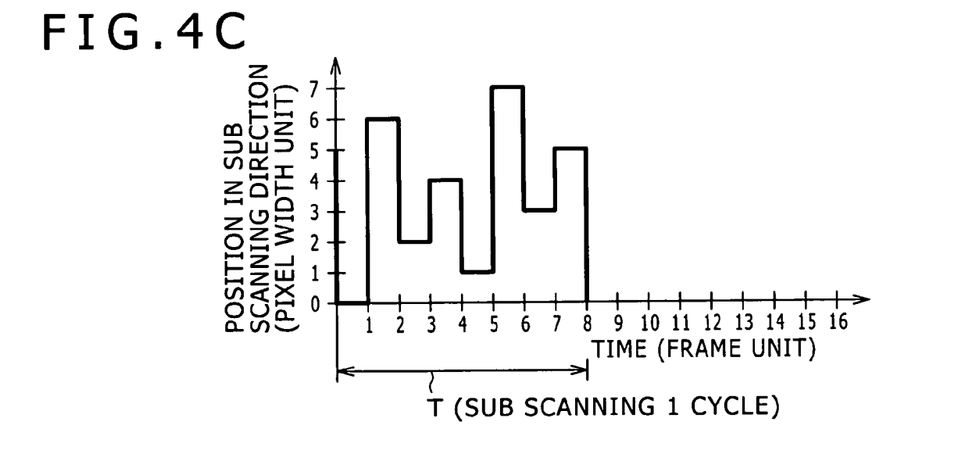

Here, the contents of the expression (2) above are described with reference to FIGS. 4A to 4C and 5. FIGS. 4A to 4C illustrate examples of a mode of movement by sub scanning where the total number of stopping positions is 8, and the axis of abscissa indicates time in a unit of a frame while the axis of ordinate indicates the position in a unit of a pixel width in the sub scanning direction.

Here, the number (Nm) of times of movement from the sub scanning origin to the sub scanning origin is the number of frames within a period of one cycle when the sub scanning optical system moves from the sub scanning origin and returns to the sub scanning origin, in other words, the number of times by which movement by sub scanning can be carried out within one cycle. The number of times in this instance includes also a case wherein, for example, when the sub scanning optical system is moved at random, the sub scanning optical system stops twice at the same position.

In the example illustrated in FIG. 4A, the sub scanning optical system moves in a movement pattern wherein it successively moves in one direction in a unit of a one-pixel width by sub scanning and then successively moves in the opposite direction similarly until it returns to the original position. Thus, FIG. 4A illustrates an example wherein the sub scanning optical system repeats movement of a pattern of a triangular wave. In this instance, while eight movement locations are involved, the number of times of movement in one cycle is 16.

In the example illustrated in FIG. 4B, the sub scanning optical system moves in a movement pattern wherein it successively moves in one direction in a unit of a one-pixel width by sub scanning similarly as in the example of FIG. 4A but thereafter moves back to the original position by one time of movement by a distance corresponding to 7 pixels. Thus, the number of times of movement in one cycle is 8.

In the example illustrated in FIG. 4C, the sub scanning optical system moves at random, and the number of times of movement in one cycle is 8.

Here, the "total movement width (Wm)" is a width from the lower end to the upper end of the sub scanning position and is, in all of the examples illustrated in FIGS. 4A to 4C, the 7-pixel width. The "sum (Wma) of absolute values of the movement widths" is the sum of all of absolute values of movement widths when the sub scanning optical system moves within one period. In the example illustrated in FIG. 4A, $$Wma=1+1+1+1+1+1+1+0+1+1+1+1+1+1+0=14$$

Meanwhile, in the example of FIG. 4B, $$Wma=1+1+1+1+1+1+1+7=14$$

Further, in the example of FIG. 4C, $$Wma=6+4+2+3+6+4+2+5=32$$

The values are normalized with the "total movement width (Wm)" and used as an index to complicatedness of the sequence of movement.

Figure 5:
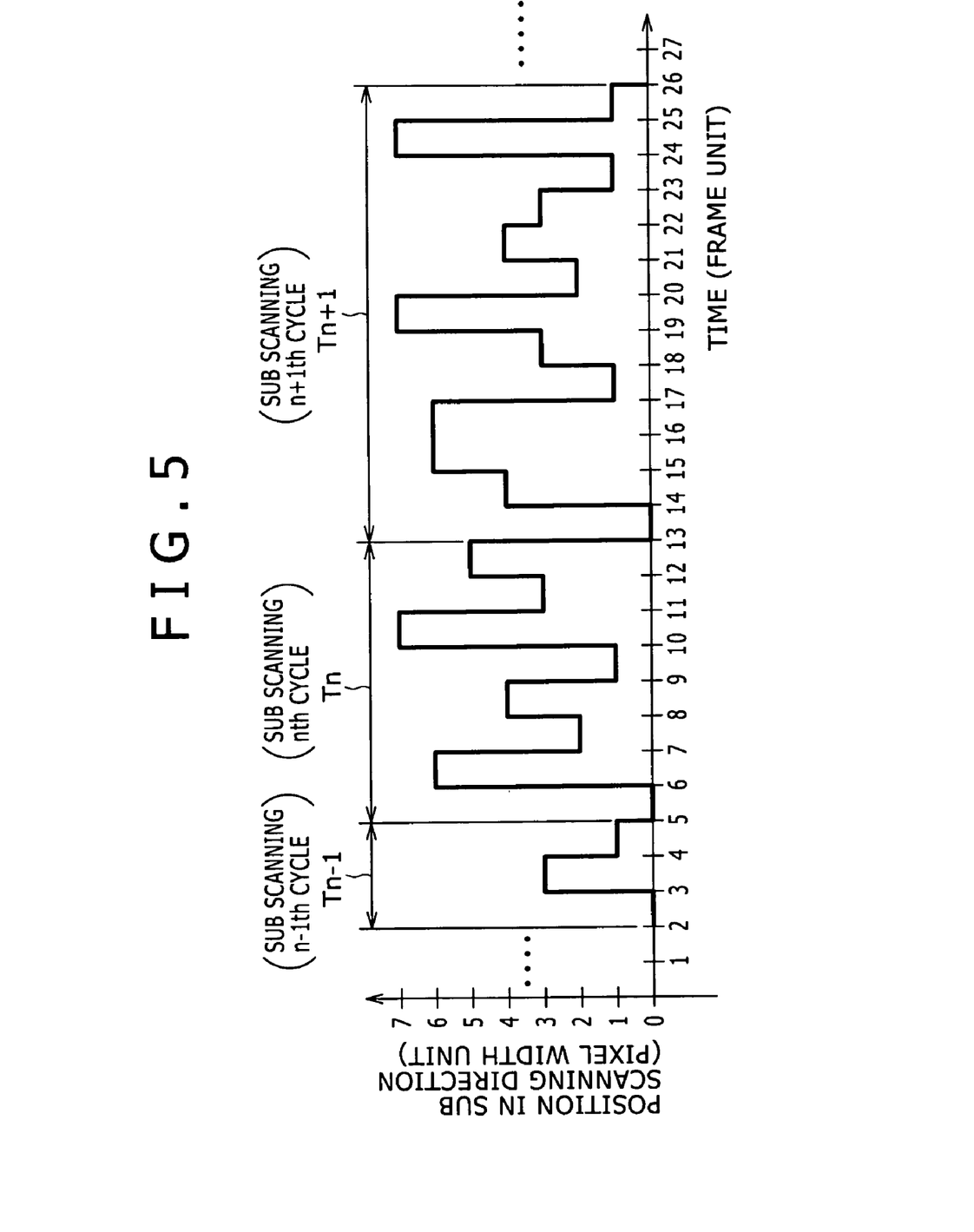

The reason why the "repeated average" is used is that the sub scanning need not necessarily be repeated by the same number of times or in the same sequence of movement for each one period of sub scanning. For example, the sequence of movement or the number of times of movement may be different for each one cycle of sub scanning as seen in FIG. 5. In the example of FIG. 5, the value of $Nm \times (2 \times Wm)/Wma$ in the expression (2) given hereinabove in the (n−1)th, nth and (n+1)th cycles is such as given by the following expressions (3) to (5), respectively:

(n−1)th cycle $$Nm \times (2 \times Wm)/Wma = 3 \times (2 \times 3)/(3+2+1)=3 \quad (3)$$

nth cycle $$Nm \times (2 \times Wm)/Wma = 8 \times (2 \times 7)/(6+4+2+3+6+4+2+5) = 3.5 \quad (4)$$

(n+1)th cycle $$Nm \times (2 \times Wm)/Wma = 13 \times (2 \times 7)/(4+2+0+5+2+4+5+2+1+2+6+6+1) \approx 4.6 \quad (5)$$

From the expressions (3) to (5) above, the value of the repeated average in the example illustrated in FIG. 5 is $$(3+3.5+4.6)/3=3.7$$

The expression (2) and the expression (1) which is represented using a frame rate have a very high correlation to flickering, and if the value of the left side of the expression (1) exceeds 15 as in the embodiment of the present invention, the flickering is suppressed conspicuously.

Now, particular examples of a sub scanning movement mode which actually suppresses flickering are described with reference to FIGS. 6A, 6B and 7.

Figure 6A:
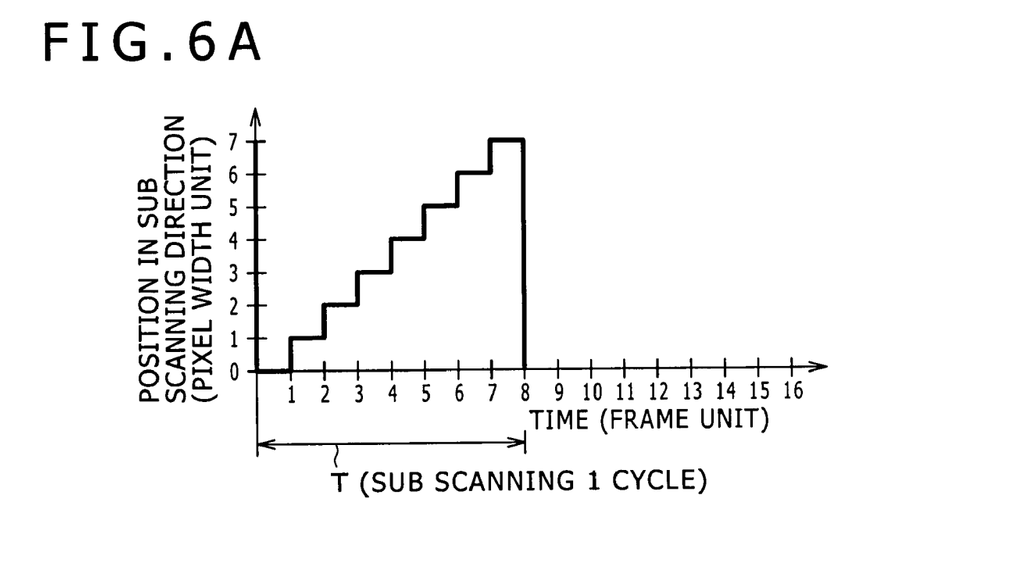

First, in order to examine the influence of the frame rate, flickering was confirmed in regard to a case wherein the total stopping position number was set to 8 and the sequence of movement was set to such a movement mode as illustrated in FIG. 6A. Where the frame rate was 60 fps, the result of calculation of the expression (1) is $$60/(8 \times (2 \times 7)/(1+1+1+1+1+1+1+7))=7.5$$

and this is smaller than 15. In this instance, flickering stood out actually.

In contrast, where the frame rate was 120 fps, the result of calculation of the expression (1) is $$120/(8 \times (2 \times 7)/(1+1+1+1+1+1+1+7))=15$$

Actually, flickering did not stand out to such a degree as to allow the image to be worth watching.

Further, where the frame rate was 240 fps, the result of calculation of the expression (1) is $$240/(8 \times (2 \times 7)/(1+1+1+1+1+1+1+7))=30>15$$

Thus, flickering was suppressed conspicuously.

Then, in order to examine the influence of the substantial number of times of movement, that is, the influence of the sequence of movement, confirmation of flickering was carried out with regard to a case wherein the total stopping position number was set to 8 and the frame rate was set to 60 fps. In an example wherein the sequence of movement illustrated in FIG. 6A was adopted, that is, in the condition same as that in the example illustrated in FIG. 4B, the result of calculation of the expression (1) is $$60/(8 \times (2 \times 7)/(1+1+1+1+1+1+1+7))=7.5$$

and this is smaller than 15. In this instance, flickering stood out actually.

Figure 6B:
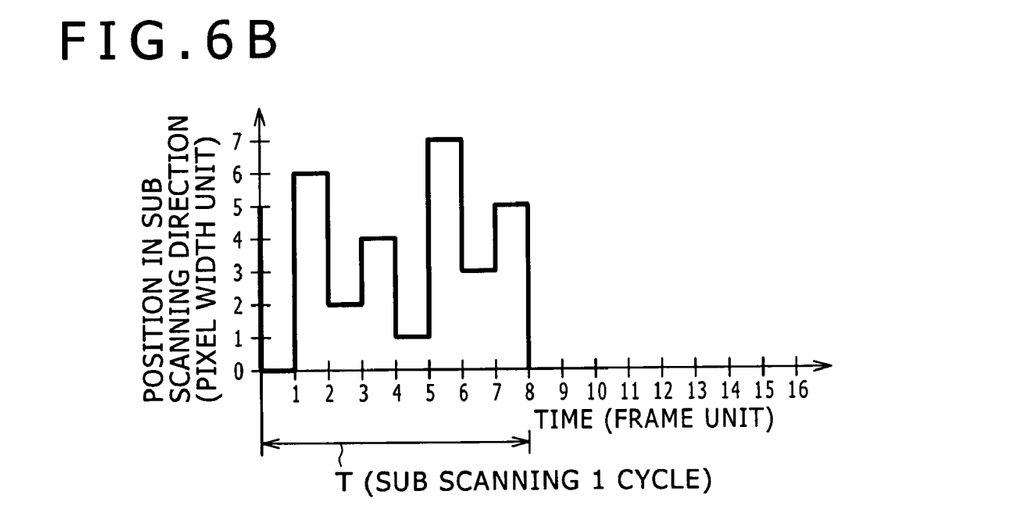

In contrast, where the sequence of movement illustrated in FIG. 6B was adopted, that is, in the condition same as that in the example illustrated in FIG. 4C, the result of calculation of the expression (1) is $$60/(8 \times (2 \times 7)/(6+4+2+3+6+4+2+5)) \approx 17.1$$

and is greater than 15. In this instance, flickering did not stand out.

Further, where the same condition as that of FIG. 5 was adopted, from the expressions (3) to (5)

$$60/(3+3.5+4.6) \approx 16.2$$

and this exceeds 15. In this instance, flickering did not stand out.

Further, similar experiments were conducted in various sequences of movement in regard to a case wherein the frame rate was set to 16 and another case wherein the total stopping position number was set to 16. From the experiments, a result that the value of the expression (1) and flickering have a very high correlation and, where the value is higher than 15, flickering can be suppressed effectively was obtained.

Figure 7:
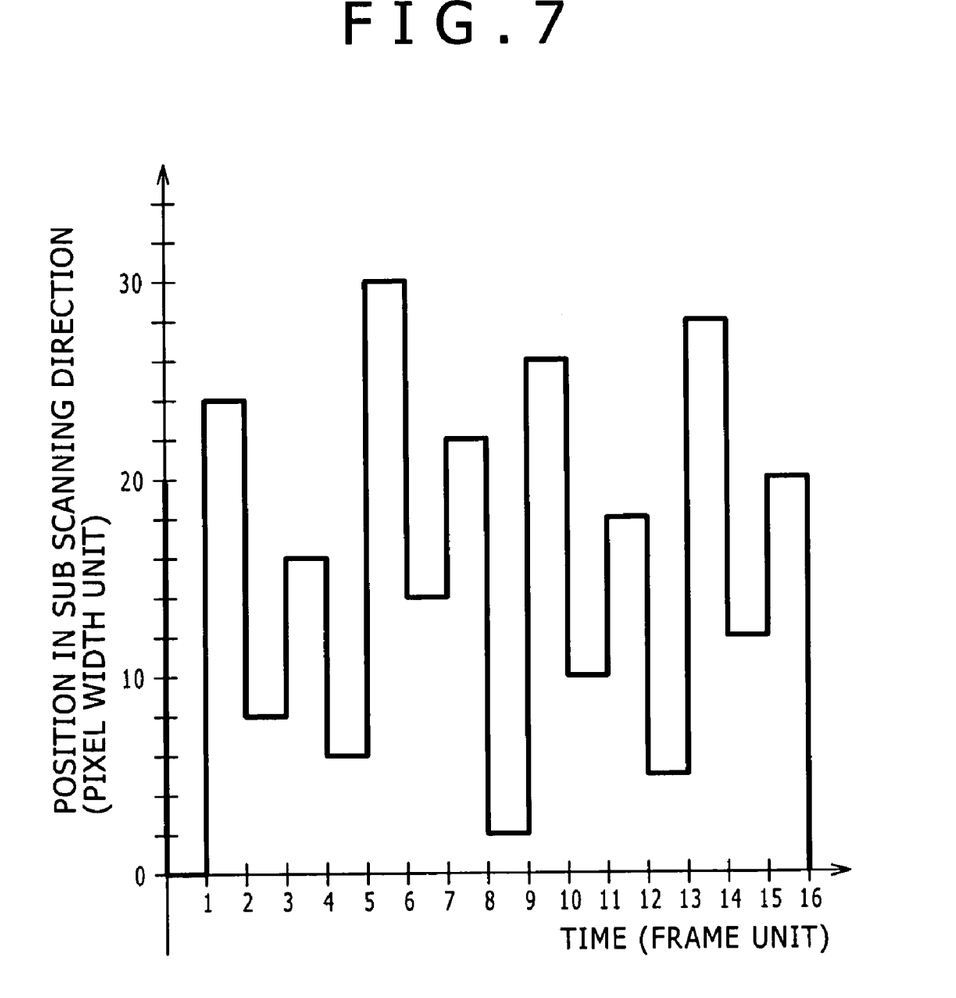
FIG. 7 is a diagrammatic view illustrating an example of a movement mode of sub scanning by the image production apparatus.

A mode of movement of sub scanning in another example wherein the condition of the expression (1) given hereinabove is satisfied is illustrated in FIG. 7. The frame rate is set to 240 fps, and such conditions of sub scanning as given below are used. In this instance, as seen in FIG. 7, the number of total stopping position number is 16 and the total movement width is 30 pixels (in the case of the total stopping position number of 8 and a two-pixel distance, the total movement width is 2 pixels×(16−1) distances=total movement width 30), and the sequence of movement is such as illustrated in FIG. 7. In this instance, the expression (1) is re-written as $$240/(16 \times (2 \times 30)/(24+16+8+10+24+16+8+20+24+16+8+14+24+16+8+20))=64$$

Thus, the resulting value 16 is sufficiently higher than 15 of the reference value, and actually, little flickering was recognized.

It is to be noted that, where the movement mode of sub scanning illustrated in FIG. 7 is used, since the total movement width is set as large as 30 pixels, a reduction effect of horizontal stripes of a great width as well as of thin stripes arising from pixels is achieved, and the improvement effect in regard to horizontal stripes can be further raised.

It is to be noted that, since the expression (1) given hereinabove is represented by "frame rate/expression (2)", it is effective to increase the "sum (Wma) of absolute values of the movement widths" included in the expression (2) as much as possible in order to suppress flickering. However, in actual use, for example, it may be desired to decrease the burden on the driving device of the sub scanning optical system. In this instance, the flickering suppression effect may be sacrificed to some degree such that the "sum (Wma) of absolute values of the movement widths" is not set to a maximum value but is set to a value reduced within a range within which the condition given by the expression (1) is satisfied. Thus, although Rf/Nsa>15 is satisfied, the value of Rf/Nsa may be set to a value near to 15.

Further, since the expression (2) given hereinabove includes the "total movement width (Wm)", the expression (1) given hereinabove is normalized with the "total movement width (Wm)". Consequently, merely complicatedness of the sequence of movement can be extracted from the "sum (Wma) of absolute values of the movement widths". This indicates that not the influence of the total movement width (Wm) but the influence of the sequence of movement is dominant.

It is to be noted that, if the condition of the expression (1) given hereinabove is satisfied, then the effect that flickering is reduced is achieved with certainty. It is to be noted that, where periodicity is not provided to sub scanning but the sub scanning optical system is moved at random, there is an effect that periodical flickering can be suppressed, and depending upon an application, random sub scanning free from periodicity may be preferable.

On the other hand, even if sub scanning has fixed periodicity, flickering can be suppressed effectively if the condition of the expression (1) is satisfied. For example, as illustrated in FIGS. 4A to 4C and 7, where the total stopping position number by sub scanning is n and the totaling n times of movement where the sub scanning optical system moves once to each of all stopping positions is determined as one cycle, if the movement of one cycle is repeated to carry out sub scanning, then flickering can be reduced sufficiently with an apparatus configuration for practical use while reducing the burden on the driving section and the driving circuit for driving the sub scanning optical system.

Further, where the total stopping position number is n, if such a condition that the probabilities of movement to all of the n movement positions are equal to each other or that the number of times of successive movement in the same direction is restricted to four times is added, then this increases the sum of absolute values of movement widths and decreases one-sidedness in movement. Accordingly, flickering arising from one-sidedness in movement which seldom occurs can be suppressed with certainty. Where the number of times of movement in the same direction is equal to or smaller than 3, substantially no flickering is visually observed. However, where the number of times of movement in the same direction is equal to or greater than four times, flickering is sometimes observed visually. Accordingly, the movement pattern is preferably set such that movement in the same direction does not successively occur by four or more times.

As described above, with the image production apparatus of the embodiment of the present invention, flickering caused by sub scanning carried out in order to suppress horizontal stripes can be suppressed.

It is to be noted that the upper limit to the value of the expression (1) depends upon the maximum operation frame rate Rf of the image production apparatus. For example, if the image reproduction apparatus has a maximum operation frame rate Rf of 240, then the upper limit to the expression (1) is 240/1=240.

2. Second Working Example

Now, as another example of the image production apparatus according to the embodiment of the present invention, an example wherein an image production apparatus which includes a sub scanning optical system of the configuration described above is configured so as to suppress ringing is described.

Where sub scanning is applied to achieve reduction of horizontal stripes, the following problem is involved as a subject to be solved in addition to the problem of flickering. In particular, if movement by sub scanning is not completed between frames of main scanning, that is, while no image is displayed, since an image moves while the image is displayed, the two-dimensional image projected is distorted. Therefore, such a situation as just described has to be avoided to the utmost. However, even where a driving source having a sufficiently high response speed is used, ringing sometimes occurs from such factors as the weight and rigidity of the sub scanning optical system, and this may appear also during image display.

The sub scanning optical system is typically placed at some place in the projection optical system. For example, a sub scanning optical system wherein the inclination of a mirror is adjusted by means of a galvano motor, a piezoelectric device or a voice coil is used or a polygon mirror is used as the main scanning optical system while individual faces of the polygon mirror are inclined such that also sub scanning, that is, scanning in a direction perpendicular to the main scanning direction, is carried out. It is to be noted that the sub scanning optical system is not limited to those having the configurations described, but may have various other configurations.

As described above, in a sub scanning optical system wherein the angle of the mirror is adjusted by the driving device, ringing is sometimes caused by such a factor as the weight or the rigidity of the mirror and so forth, resulting in the possibility that it may not be suppressed merely by optimization of the factors. The ringing relies merely upon the driving waveform to be applied to the driving device and is likely to occur where driving of a stepped waveform which is used popularly is used.

Figure 8A:
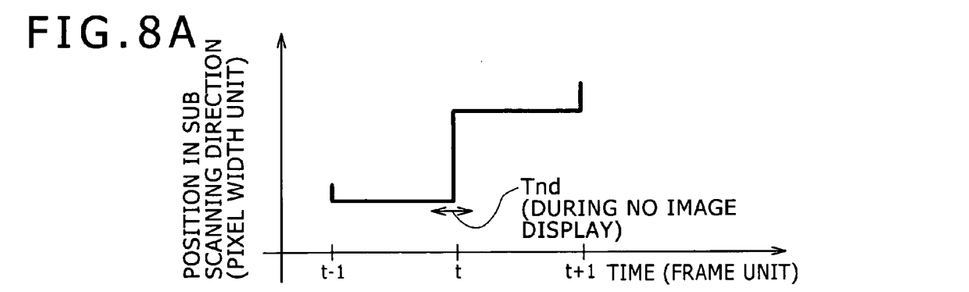
FIG. 8A is a diagrammatic view illustrating a movement mode of sub scanning by a comparative example and FIGS. 8B to 8D are diagrammatic views illustrating different movement modes of sub scanning by the image production apparatus.
Figure 8B:
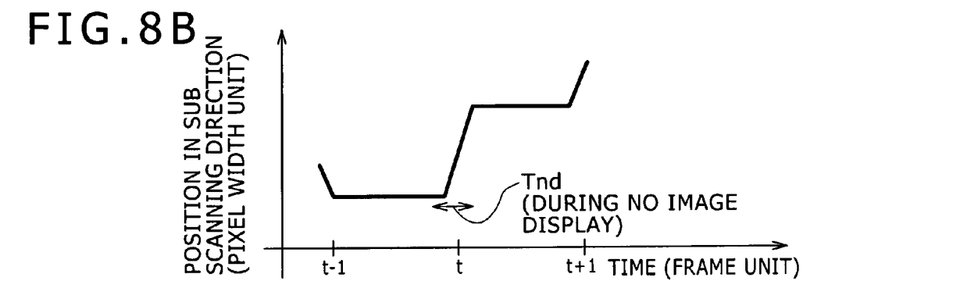
Figure 8C:
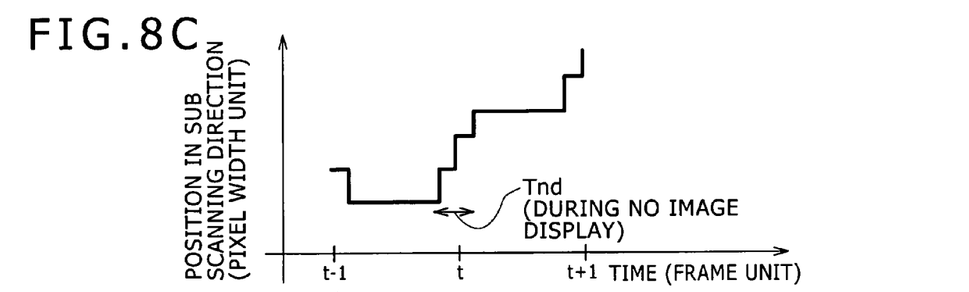
Figure 8D:
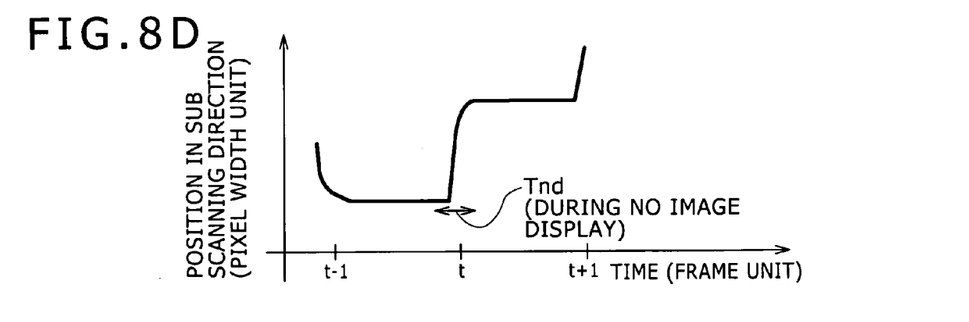

Therefore, in the present embodiment, a driving voltage not of such a stepped waveform as seen in FIG. 8A but of a waveform for carrying out such movement which has some inclination as seen in FIG. 8B, such another waveform for carrying out finely divided movement as seen in FIG. 8C or such a smooth waveform similar to an output waveform of a low pass filter as seen in FIG. 8D, is applied to the driving device of the sub scanning optical system which is formed from a voice coil or the like. Where such driving waveforms are applied, occurrence of ringing can be suppressed effectively.

The waveform example illustrated in FIG. 8A is a comparative example wherein a driving voltage of a stepped waveform is applied, and with the waveform, ringing appears with a width greater than the pixel width of the optical modulation apparatus. It is to be noted that reference character Tnd in FIGS. 8A to 8D denotes a no-image display period. Ringing which appears in the present example does not converge in 0.6 milliseconds within which no image is displayed, but has a bad influence that an image is distorted during display of the image.

On the other hand, where any of the driving voltage waveforms illustrated in FIGS. 8B to 8D is used, appearance of ringing is suppressed. The driving voltage waveform of the example illustrated in FIG. 8B is sometimes selected so as to carry out movement having some inclination.

In the example illustrated in FIG. 8C, the driving voltage waveform provides division of movement such that finely divided movements are carried out successively.

The example illustrated in FIG. 8D exhibits such a driving voltage waveform, for example, similar to an output waveform of a low pass filter and is used to achieve smooth movement.

Such driving voltage waveforms were inputted to the voice coil, and the angle of the mirror was measured by an auto collimator to check the response. As a result, although the magnitude of ringing varies depending upon such a parameter as the inclination or the divisional number, if suitable values are selected, then the ringing decreases significantly, and the distortion of the image on the screen is improved to such a level that it may not be recognized by visual observation.

It is to be noted that the sub scanning by the sub scanning optical system is not limited to the modes of movement illustrated in FIGS. 8B to 8D, but may provide, for example, such movement which cancels ringing. Or, also where the sub scanning provides such movement as is obtained by a combination of some of the movement modes illustrated in FIGS. 8B to 8D, ringing can be suppressed efficiently.

Further, while, in the embodiment described above, sub scanning by the sub scanning optical system satisfies the expression (1) given hereinabove to suppress flickering and suppress ringing. However, merely the configuration for setting, as the driving voltage waveform, any of the waveforms shown in FIGS. 8B to 8D and the driving waveform for canceling ringing may be adopted. In this instance, an effect that flickering caused by ringing is suppressed can be achieved.

As described above, according to the embodiment of the present invention, flickering arising from sub scanning carried out for suppression of horizontal stripes can be suppressed. Further, ringing by sub scanning can be suppressed, and appearance of distortion of an image upon image display can be prevented.

It is to be noted that the embodiment of the present invention is not limited to the configurations described hereinabove in connection with the preferred embodiment thereof, and various modifications and alterations can be made for the materials, configurations and so forth of the light source, illuminating optical system and optical modulation apparatus of the image production apparatus and the material and configuration of the projection optical system other than the configuration of the sub scanning optical system without departing from the spirit and scope of the embodiment of the present invention.

What is claimed is:

1. An image production apparatus, comprising:
a light source;
an optical modulation apparatus of the one-dimensional type; and
a projection optical system including a scanning optical system;
said scanning optical system including
a main scanning optical system, and a sub scanning optical system for carrying out scanning in a direction perpendicular to an optical axis, and
a scanning direction by said main scanning optical system,
the sub scanning by said sub scanning optical system is carried out between frames of the main scanning by said main scanning optical system,
a frame rate and an average of substantial numbers of times of movement until said sub scanning optical system returns from a sub scanning origin to the sub scanning origin satisfy a relationship of $Rf/Ns > 15$ where $Rf$ is the frame rate and $Ns$ is the average of substantial numbers of times of movement.

2. The image production apparatus according to claim 1, wherein the total number of stopping positions by the sub scanning is n and, where the movement by the totaling n times of movement when said sub scanning optical system moves once to each of all stopping positions is determined as one cycle, the movement for the one cycle is repeated.

3. The image production apparatus according to claim 1, wherein the total number of stopping positions by the sub scanning is n and the probabilities of movement to the totaling n stopping positions are equal to each other.

4. The image production apparatus according to claim 1, wherein the movement by the sub scanning is not carried out successively by four times or more in the same direction.

5. The image production apparatus according to claim 1, further comprising
a display section configured to display image light projected by the scanning.

6. The image production apparatus according to claim 1, wherein the movement by the sub scanning is carried out in a mode the movement has some inclination, another mode the movement is divided finely, a further mode the movement is carried out smoothly or a still further mode the movement is carried out in a combination of some of the modes mentioned.

* * * * *